United States Patent
Suzuki

(10) Patent No.: US 11,646,428 B2
(45) Date of Patent: May 9, 2023

(54) PHOTOCURABLE RESIN COMPOSITION, FUEL CELL, AND SEALING METHOD

(71) Applicant: THREEBOND CO., LTD., Tokyo (JP)

(72) Inventor: Nao Suzuki, Tokyo (JP)

(73) Assignee: THREEBOND CO., LTD., Tokyo (JP)

( * ) Notice: Subject to any disclaimer, the term of this patent is extended or adjusted under 35 U.S.C. 154(b) by 0 days.

(21) Appl. No.: 17/349,171

(22) Filed: Jun. 16, 2021

(65) Prior Publication Data

US 2021/0399316 A1    Dec. 23, 2021

(30) Foreign Application Priority Data

Jun. 17, 2020 (JP) .............................. JP2020-104162

(51) Int. Cl.

| | |
|---|---|
| *H01M 8/0284* | (2016.01) |
| *C08L 23/26* | (2006.01) |
| *C09K 3/10* | (2006.01) |
| *H01M 8/0273* | (2016.01) |
| *H01M 8/0286* | (2016.01) |

(Continued)

(52) U.S. Cl.
CPC ........... *H01M 8/0284* (2013.01); *C08L 23/26* (2013.01); *C09K 3/10* (2013.01); *H01M 8/0273* (2013.01); *H01M 8/0286* (2013.01); *H01M 8/1004* (2013.01); *H01M 8/1018* (2013.01); *C08L 2203/206* (2013.01); *C09K 2003/1062* (2013.01); *C09K 2200/0617* (2013.01); *H01M 2008/1095* (2013.01); *H01M 2300/0082* (2013.01)

(58) Field of Classification Search
None
See application file for complete search history.

(56) References Cited

U.S. PATENT DOCUMENTS

| | | | |
|---|---|---|---|
| 8,329,322 B2 | 12/2012 | Morimoto et al. | |
| 2005/0043480 A1 | 2/2005 | Osawa | |

(Continued)

FOREIGN PATENT DOCUMENTS

| | | |
|---|---|---|
| EP | 0353471 B1 | 1/1994 |
| EP | 3611199 A1 | 2/2020 |

(Continued)

OTHER PUBLICATIONS

EPO, Extended European Search Report for the corresponding European Patent Application No. 21177786.7, dated Nov. 19, 2021.

*Primary Examiner* — Alix E Eggerding
(74) *Attorney, Agent, or Firm* — Lucas & Mercanti, LLP

(57) ABSTRACT

An object of the present invention is to provide a photocurable resin composition having a high curing degree after irradiation with light while maintaining cured material characteristics such as high extensibility and high strength.
Provided is a photocurable resin composition including the following ingredients (A) to (C):
  ingredient (A): a polyisobutylene resin containing one or more (meth)acryloyl groups and a —[CH$_2$C(CH$_3$)$_2$]— unit;
  ingredient (B): ingredient (b1): an acrylate monomer having an alicyclic hydrocarbon group having 5 to 25 carbon atoms, and ingredient (b2): an acrylate monomer having a linear or branched alkyl group having 11 to 30 carbon atoms; and
  ingredient (C): a photo-radical polymerization initiator.

18 Claims, 1 Drawing Sheet

(51) Int. Cl.
*H01M 8/1004* (2016.01)
*H01M 8/1018* (2016.01)
*H01M 8/10* (2016.01)

(56) References Cited

U.S. PATENT DOCUMENTS

| | | | | |
|---|---|---|---|---|
| 2007/0160888 A1* | 7/2007 | Takahashi | ............... | C08J 5/2237 |
| | | | | 429/535 |
| 2015/0210882 A1* | 7/2015 | Burdzy | ................ | C09D 133/08 |
| | | | | 277/316 |
| 2020/0048389 A1* | 2/2020 | Soga | ..................... | C08F 290/04 |

FOREIGN PATENT DOCUMENTS

| | | |
|---|---|---|
| JP | H02-88614 A | 3/1990 |
| JP | 2004-075824 A | 3/2004 |
| JP | 2004-111146 A | 4/2004 |
| JP | 2007-100099 A | 4/2007 |
| JP | 2009-096413 A | 5/2009 |
| JP | 2013148785 A | 8/2013 |
| JP | 2013-229323 A | 11/2013 |
| WO | 2009/047908 A1 | 4/2009 |
| WO | WO 2018/190415 * | 10/2018 |

\* cited by examiner

PHOTOCURABLE RESIN COMPOSITION, FUEL CELL, AND SEALING METHOD

CROSS-REFERENCE TO RELATED APPLICATION

Japanese Patent Application No. 2020-104162 filed on Jun. 17, 2020, including description, claims, drawings, and abstract the entire disclosure is incorporated herein by reference in its entirety.

BACKGROUND

1. Technical Field

The present invention relates to a photocurable resin composition, a fuel cell, and a sealing method.

2. Description of Related Arts

In recent years, fuel cells have drawn attention as new energy systems for automobiles and households. A fuel cell is a power generator that extracts electricity by chemically reacting hydrogen and oxygen. In addition, the fuel cell is a clean power generator of the next generation because the fuel cell achieves a high energy efficiency in power generation, and forms water from the reaction of the hydrogen and the oxygen. As for fuel cells, there are four types including a polymer electrolyte fuel cell, a phosphoric acid fuel cell, a molten carbonate fuel cell, and a solid oxide fuel cell. Among them, the polymer electrolyte fuel cell achieves high power generation efficiency while having a relatively low operating temperature (around 80° C.), and therefore is expected to be used for applications such as power sources for automobiles, power generators for households, small power sources for electronic devices such as mobile phones, and power sources for emergency.

As illustrated in FIG. 1, a cell 1 of a polymer electrolyte fuel cell has a structure including: an electrolyte membrane electrode assembly 5 (MEA) structured such that a polymer electrolyte membrane 4 is nipped between an air electrode 3a and a fuel electrode 3b; a frame 6 that supports the MEA; and separators 2 in which gas flow paths are formed.

In order to activate the polymer electrolyte fuel cell, it is necessary to supply a fuel gas containing hydrogen to the fuel electrode (anode) 3b and supply an oxidation gas containing oxygen to the air electrode (cathode) 3a in such a separated manner that these gases can be isolated from each other. This is because there is a risk of lowering the power generation efficiency if one of the gases is mixed with the other gas due to insufficiency of the isolation. Against such a background, a sealing agent is used in many portions for the purpose of preventing leakage of the fuel gas, the oxygen gas, and the like. Specifically, a sealing portion 7 formed using the sealing agent is arranged between the separators 2 adjacent to each other, between the separator 2 and the frame 6, between the frame 6 and the polymer electrolyte membrane 4 or the MEA 5, or the like.

As to sealing agents for use in polymer electrolyte fuel cells, studies have been made on: a thermosetting resin composition which uses a polyisobutylene-based polymer and causes a hydrosilylation reaction (see JP 2004-111146 A); a thermosetting resin composition which uses a fluoropolyether compound and causes a hydrosilylation reaction (see JP 2004-075824 A (US 2005/043480 A)); a thermosetting resin composition which uses a fluoropolymer and causes a hydrosilylation reaction (see JP 2007-100099 A); and a thermosetting resin composition which uses an ethylene-propylene-diene rubber (see JP 2013-229323 A) as these compositions are rubber elastic bodies being excellent in gas permeation resistance, low moisture permeability, heat resistance, acid resistance, and flexibility. However, the thermosetting resin compositions of JP 2004-111146 A, JP 2004-075824 A, JP 2007-100099 A, and JP 2013-229323 A have a problem that a heating step is necessary for the curing process, and a process time is required. Therefore, attention has been paid to a photocurable resin composition in which a reduction in takt time in the curing step is achieved. JP H02-88614 A (corresponding to EP 0353471 B) discloses a polymer composition including a telechelic polyisobutylene polymer having 2 or 3 acrylate groups at each end and a reactive diluent.

SUMMARY

It has been reported that the photocurable resin composition is used for joining a polymer electrolyte membrane or the like, but when the curing degree after irradiation with light is low and the reaction is not sufficiently conducted, a volatile component is generated from the cured material and the volatile component adheres to the catalyst layer, which may cause deterioration in power generation performance (see WO 2009/047908 A and JP 2009-096413 A). In addition, the cured material of the polymer composition disclosed in JP H02-88614 A has cured material characteristics such as high extensibility and high strength. However, the cured material has a low curing degree after irradiation with light, and volatile components are likely to be generated from the cured material, which have been problematic.

The present invention has been made in view of the above circumstances, and provides a photocurable resin composition having a high curing degree after irradiation with light while maintaining cured material characteristics such as high extensibility and high strength.

The gist of the present invention is described below.

[1] A photocurable resin composition including the following ingredients (A) to (C):

ingredient (A): a polyisobutylene resin containing one or more (meth)acryloyl groups and a —[CH$_2$C(CH$_3$)$_2$]— unit;

ingredient (B): ingredient (b1): an acrylate monomer having an alicyclic hydrocarbon group having 5 to 25 carbon atoms, and ingredient (b2): an acrylate monomer having a linear or branched alkyl group having 11 to 30 carbon atoms; and ingredient (C): a photo-radical polymerization initiator.

[2] The photocurable resin composition according to [1], wherein the ingredient (A) is a polyisobutylene resin represented by the following Formula (1):

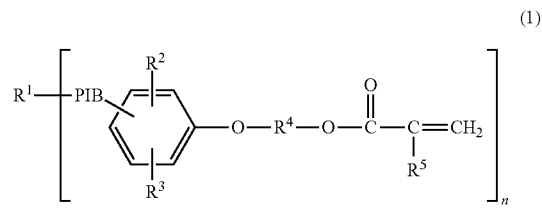

wherein R$^1$ represents a monovalent or polyvalent aromatic hydrocarbon group or a monovalent or polyvalent aliphatic hydrocarbon group, PIB represents a polyisobutylene skeleton containing the —[CH$_2$C(CH$_3$)$_2$]— unit, $R^4$ represents a divalent hydrocarbon group having 2 to 6 carbon atoms, $R^2$ and $R^3$ each independently represent a hydrogen atom or a monovalent hydrocarbon group having 1 to 20 carbon atoms, $R^5$ represents a hydrogen atom or a methyl group, and n is an integer from 1 to 6.

[3] The photocurable resin composition according to [1] or [2], including 20 to 95 parts by mass of the ingredient (b1) and 3 to 70 parts by mass of the ingredient (b2), relative to 100 parts by mass of the ingredient (A).

[4] The photocurable resin composition according to any one of [1] to [3], wherein the ingredient (b1) is one or more compounds selected from the group consisting of cyclohexyl acrylate, trimethylcyclohexyl acrylate, 4-tert-Butylcyclohexyl acrylate, dicyclopentanyl acrylate, dicyclopentenyl acrylate, dicyclopentenyloxy acrylate, isobornyl acrylate, and adamantyl acrylate, and the ingredient (b2) is one or more compounds selected from the group consisting of isostearyl acrylate, stearyl acrylate, tridecyl acrylate, lauryl acrylate, tetradecyl acrylate, pentadecyl acrylate, hexyldecyl acrylate, heptadecyl acrylate, and octylnonyl acrylate.

[5] The photocurable resin composition according to [1], wherein the ingredient (b1) is one or more compounds selected from the group consisting of 4-tert-butylcyclohexyl acrylate, dicyclopentanyl acrylate, dicyclopentenyl acrylate and isobornyl acrylate, and the ingredient (b2) is one or more compounds selected from the group consisting of isostearyl acrylate, tridecyl acrylate, lauryl acrylate, and tetradecyl acrylate.

[6] The photocurable resin composition according to [1], comprising 30 to 90 parts by mass of the ingredient (b1) and 5 to 60 parts by mass of the ingredient (b2), relative to 100 parts by mass of the ingredient (A).

[7] The photocurable resin composition according to [1], wherein a curing degree of the photocurable resin composition is 75% or more.

[8] The photocurable resin composition according to [1], wherein a tensile strength of a cured material of the photocurable resin composition is 1.2 MPa or more.

[9] The photocurable resin composition according to [1], wherein an elongation of a cured material of the photocurable resin composition is 310% or more.

[10] A curable sealing agent for a fuel cell, including the photocurable resin composition set forth in any one of [1] to [9].

[11] The curable sealing agent for a fuel cell according to [10], wherein the curable sealing agent for a fuel cell is a curable sealing agent for a periphery of one or more members selected from the group consisting of a separator, a frame, a polymer electrolyte membrane, a fuel electrode, an air electrode, and an electrolyte membrane electrode assembly, which are members in a fuel cell.

[12] The curable sealing agent for a fuel cell according to [11], wherein the curable sealing agent for a fuel cell is a sealing agent between adjacent separators in a fuel cell or a sealing agent between a frame and a polymer electrolyte membrane or an electrolyte membrane electrode assembly in the fuel cell.

[13] The curable sealing agent for a fuel cell according to any one of [10] to [12], wherein the curable sealing agent for a fuel cell is a curable sealing agent for a polymer electrolyte fuel cell.

[14] A cured material which is formed by irradiating the photocurable resin composition set forth in any one of [1] to [9] with light.

[15] A cured material which is formed by irradiating the curable sealing agent for a fuel cell set forth in any one of [10] to [13] with light.

[16] A fuel cell, including a sealing portion between adjacent separators in the fuel cell or a sealing portion between a frame and a polymer electrolyte membrane or an electrolyte membrane electrode assembly in the fuel cell which includes the cured material set forth in [15].

[17] The fuel cell according to [16], wherein the fuel cell is a polymer electrolyte fuel cell.

[18] A method for sealing at least part of two flanges, at least one of the flanges being an active-energy-ray-transmissive flange, the method including: applying the photocurable resin composition set forth in any one of [1] to [9] to a surface of one of the flanges; sticking the one flange with the photocurable resin composition applied thereto onto the other flange with the photocurable resin composition interposed therebetween; and curing the photocurable resin composition by irradiating the photocurable resin composition with active energy rays through the active-energy-ray-transmissive flange and sealing the at least part of the two flanges.

[19] A method for sealing at least part of two flanges including: applying the photocurable resin composition set forth in any one of [1] to [9] to a surface of one of the flanges; curing the photocurable resin composition by irradiating the photocurable resin composition with active energy rays and forming a gasket formed of a cured material of the photocurable resin composition on the one flange; and placing the other flange on the gasket and sealing the at least part of the two flanges by pressure bonding the one flange and the other flange together with the gasket interposed therebetween.

[20] A method for sealing at least part of two flanges including: placing a gasket formation mold on one of the flanges; injecting the photocurable resin composition set forth in any one of [1] to [9] into at least part of a cavity formed between the gasket formation mold and the one flange; curing the photocurable resin composition by irradiating the photocurable resin composition with active energy rays and forming a gasket formed of a cured material of the photocurable resin composition on the one flange; detaching the mold from the one flange; and placing the other flange on the gasket and sealing the at least part of the two flanges by pressure bonding the one flange and the other flange together with the gasket interposed therebetween.

DETAILED DESCRIPTION

Figure 1:
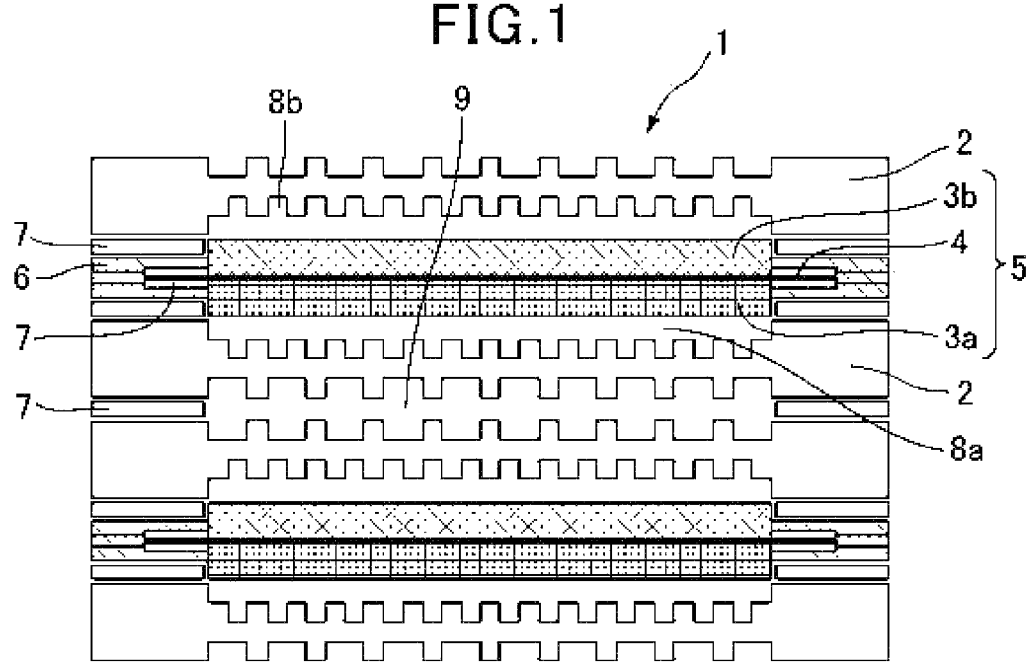
FIG. 1 is a schematic cross-sectional view of a single cell of a fuel cell.

One embodiment of the present invention is a photocurable resin composition containing the following ingredients (A) to (C):

ingredient (A): a polyisobutylene resin containing one or more (meth)acryloyl groups and a —$[CH_2C(CH_3)_2]$— unit;

ingredient (B): ingredient (b1): an acrylate monomer having an alicyclic hydrocarbon group having 5 to 25 carbon atoms, and ingredient (b2): an acrylate monomer having a linear or branched alkyl group having 11 to 30 carbon atoms; and ingredient (C): a photo-radical polymerization initiator.

According to the present invention, there is provided a photocurable resin composition having a high curing degree after irradiation with light while maintaining cured material characteristics such as high extensibility and high strength.

Details of the invention are described below.

<Ingredient (A)>

An ingredient (A) used in the present invention is not particularly limited as long as it is a polyisobutylene resin containing a —[$CH_2C(CH_3)_2$]— unit (polymer having a polyisobutylene skeleton), the resin having one or more (meth)acryloyl groups. The ingredient (A) may be a polymer which contains the —[$CH_2C(CH_3)_2$]— unit (polyisobutylene skeleton), for example, and may be a polymer contains the —[$CH_2C(CH_3)$ 2]— unit and a "constituent unit other than —[$CH_2C(CH_3)_2$]— unit". A suitable content of the —[$CH_2C(CH_3)_2$]— units in the ingredient (A) is, for example, 70% by mass or more, preferably 75% by mass or more, and more preferably 80% by mass or more relative to the total amount of the constituent units. Further, the suitable content of the —[$CH_2C(CH_3)_2$]— units in the ingredient (A) is, for example, less than 100% by mass, 95% by mass or less in another mode, and 90% by mass or less in still another mode, relative to the total amount of the constituent units. It is suitable that the ingredient (A) contains preferably 1 to 12 (meth)acryloyl groups, more preferably 2 to 8 (meth)acryloyl groups, still more preferably 2 to 4 (meth) acryloyl groups, and particularly preferably 2 (meth)acryloyl groups. In the present invention, the polymer is not theoretically restricted but is defined as, for example, a compound having a structure in which the main chain of the polymer contains repeating units of a monomer, the compound containing 100 or more of the repeating units. Further, the (meth)acryloyl group may be present at any of a side chain and/or a terminal of the molecule, and is preferably present at the terminal of the molecule from the viewpoint of excellent cured material characteristics such as high extensibility and high strength.

As the ingredient (A), a polyisobutylene resin represented by the following Formula (1) is preferable from the viewpoint of obtaining a photocurable resin composition having excellent cured material characteristics such as high extensibility and high strength. Specific examples of the ingredient (A) include a polyisobutylene resin having a (meth) acryloyloxyalkoxyphenyl group. Note that, although the main skeleton of the ingredient (A) in the present invention is a polyisobutylene skeleton, as monomers constituting this polyisobutylene skeleton, other monomers may be used for copolymerization in addition to the mainly used isobutylene as long as the effects of the present invention are not impaired. Here, the ingredient (A) is preferably in a liquid state at ambient temperature (25° C.) because it is possible obtain a photocurable resin composition that is more applicable to coating using screen printing.

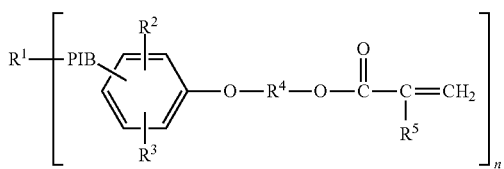

(1)

In the Formula (1), $R^1$ represents a monovalent or polyvalent aromatic hydrocarbon group or a monovalent or polyvalent aliphatic hydrocarbon group, preferably a polyvalent aromatic hydrocarbon group, and particularly preferably a divalent phenylene group. Here, the polyvalent aromatic hydrocarbon group and the polyvalent aliphatic hydrocarbon group refer to a divalent to hexavalent aromatic hydrocarbon group and a divalent to hexavalent aliphatic hydrocarbon group, respectively. PIB represents a polyisobutylene skeleton containing the —[$CH_2C(CH_3)_2$]— unit (or consisting of the —[$CH_2C(CH_3)_2$]— unit). $R^4$ represents a divalent hydrocarbon group having 2 to 6 carbon atoms, and is preferably a divalent hydrocarbon group having 2 or 3 carbon atoms. The divalent hydrocarbon group is preferably an alkylene group, an alkenylene group, an alkynylene group, or the like. The divalent hydrocarbon group may have any substituent such as a halogen atom, an amino group, a cyano group, a nitro group, or a hydroxy group. $R^2$ and $R^3$ each independently represent a hydrogen atom or a monovalent hydrocarbon group having 1 to 20 carbon atoms, and are preferably a hydrogen atom. Examples of the monovalent hydrocarbon group include an alkyl group, an alkenyl group, an alkynyl group, and the like, and these monovalent hydrocarbon groups may have any substituent such as a halogen atom, an amino group, a cyano group, a nitro group, or a hydroxy group. $R^5$ represents a hydrogen atom or a methyl group. n is any integer from 1 to 6, and is particularly preferably an integer from 2 to 4. When n is 2 or more, PIB, $R^2$, $R^3$, $R^4$, and $R^5$ may be identical or different.

The molecular weight of the ingredient (A) in the present invention is not particularly limited. The number average molecular weight by chromatography measurement is, for example, preferably 200 to 500,000, more preferably 1,000 to 100,000, and particularly preferably 3,000 to 50,000, because the photocurable resin composition is applicable to coating using screen printing, and has excellent cured material characteristics such as high extensibility and high strength. Here, the number average molecular weight was calculated by a calculation method in terms of standard polystyrene using size-exclusion chromatography (SEC). When two or more kinds of the ingredient (A) are used in combination, the number average molecular weight of at least one of them is preferably within the above range.

The viscosity at 25° C. of the ingredient (A) in the present invention is not particularly limited, and is, for example, 5 Pa·s or more, preferably 50 Pa·s or more, and more preferably 100 Pa·s or more from the viewpoint of workability and the like. The viscosity is, for example, 3000 Pa·s or less, preferably 2500 Pa·s or less, and more preferably 2000 Pa·s or less. A particularly preferable viscosity is 1750 Pa·s or less. Unless otherwise specified, the viscosity at 25° C. was measured using a cone-plate type viscometer. When two or more kinds of the ingredient (A) are used in combination, the viscosity of at least one of them is preferably within the above range.

A method for producing the ingredient (A) is not particularly limited, and any publicly known method may be used. Examples thereof include an obtaining method including reacting hydroxyl-terminated polyisobutylene with an acryloyl chloride or methacryloyl chloride, which are disclosed by T. P. Liao and J. P. Kennedy, Polymer Bulletin, Vol. 6, pp. 135 to 141 (1981), and Puskas et al., Polymer Bulletin, Vol. 20, pp 253 to 260 (1988). Examples of other methods for producing the ingredient (A) include a method including reacting hydroxyl-terminated polyisobutylene with a compound having an (meth)acryloyl group and an isocyanate group; a method including reacting hydroxyl-terminated polyisobutylene with a compound containing an isocyanate group and a compound containing an (meth)acryloyl group and a hydroxyl group; a method including reacting hydroxyl-terminated polyisobutylene with an (meth)acrylic acid or a lower ester of (meth)acrylic acid by a dehydration esterification method or an ester exchange method; and the like.

Further, a method for producing the polyisobutylene resin represented by the Formula (1) is not particularly limited, and is preferably a method including reacting a halogen-terminated polyisobutylene disclosed in JP 2013-216782 A with a compound represented by the following Formula (2) which contains an (meth)acryloyl group and a phenoxy group. Furthermore, the halogen-terminated polyisobutylene can be obtained by any publicly known method, and is obtained, for example, by cationic polymerization, and more preferably by living cationic polymerization.

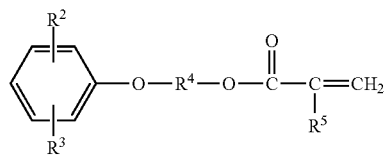

(2)

In the Formula (2), $R^2$, $R^3$, $R^4$, and $R^5$ may be as defined in the Formula (1). Specifically, $R^4$ represents a divalent hydrocarbon group having 2 to 6 carbon atoms. $R^2$ and $R^3$ each independently represent a hydrogen atom or a monovalent hydrocarbon group having 1 to 20 carbon atoms. $R^5$ represents a hydrogen atom or a methyl group. Examples of the compound represented by the Formula (2) include phenoxymethyl(meth)acrylate, phenoxyethyl(meth)acrylate, phenoxypropyl(meth)acrylate, phenoxybutyl(meth)acrylate, and phenoxypentyl(meth)acrylate, and the like, and preferable examples thereof include phenoxyethyl(meth)acrylate, phenoxypropyl(meth)acrylate, phenoxybutyl(meth)acrylate, phenoxypentyl(meth)acrylate, and the like.

<Ingredient (B)>

An ingredient (B) of the present invention is an ingredient (b1): an acrylate monomer having an alicyclic hydrocarbon group having 5 to 25 carbon atoms, and an ingredient (b2): an acrylate monomer having a linear or branched alkyl group having 11 to 30 carbon atoms. The ingredient (b1) and the ingredient (b2) are combined, so that it is possible to obtain a photocurable resin composition having a high curing degree after irradiation with light while maintaining cured material characteristics such as high extensibility and high strength. Further, the ingredient (b1) and the ingredient (b2) are combined, thereby exerting an effect that the viscosity is low and the adhesive strength to polyethylene naphthalate (PEN) used for the frame is excellent. The acrylate monomer of the ingredient (B) is preferably monofunctional from the viewpoint that the viscosity is low, the adhesive strength to polyethylene naphthalate (PEN) is excellent, and cured material characteristics such as high extensibility and high strength are excellent. The ingredient (B) is, for example, a compound represented by $H_2C=CH-C(=O)-O-R^6$. The compound in which $R^6$ is an alicyclic hydrocarbon group having 5 to 25 carbon atoms corresponds to the ingredient (b1), and the compound in which $R^6$ is a linear or branched alkyl group having 11 to 30 carbon atoms corresponds to the ingredient (b2).

Examples of the alicyclic hydrocarbon group having 5 to 25 carbon atoms in the ingredient (b1) include a cyclohexyl group, a trimethylcyclohexyl group, a 4-tert-butylcyclohexyl group, a dicyclopentanyl group, a dicyclopentenyl group, an isobornyl group, an adamantyl group, and the like. The ingredient (b1) is not particularly limited, and examples thereof include cyclohexyl acrylate, trimethylcyclohexyl acrylate, 4-tert-butylcyclohexyl acrylate, dicyclopentanyl acrylate, dicyclopentenyl acrylate, dicyclopentenyloxyethyl acrylate, isobornyl acrylate, adamantyl acrylate, and the like. Among them, 4-tert-butylcyclohexyl acrylate, dicyclopentanyl acrylate, dicyclopentenyl acrylate, and isobornyl acrylate are preferable. The ingredient (b1) may be used singly or as a mixture of two or more kinds thereof. Further, the commercially available product of the ingredient (b1) is not particularly limited, and examples thereof include SR-506 (isobornyl acrylate, manufactured by Sartomer USA, LLC), FA-513AS (dicyclopentanyl acrylate, manufactured by Showa Denko Materials Co., Ltd.), TBCHA (4-tert-butylcyclohexyl acrylate, manufactured by KJ Chemicals Corporation), IB-XA (isobornyl acrylate, manufactured by KYOEISHA CHEMICAL Co., LTD.), and the like.

The number of carbon atoms of the ingredient (b2) is preferably 25 or less, preferably 23 or less, and more preferably 21 or less. Further, as the ingredient (b2), when an acrylate monomer having a linear alkyl group is selected, the curing degree is more excellent, and when an acrylate monomer having a branched alkyl group is selected, a cured material having higher strength can be obtained. Examples of the ingredient (b2) include isostearyl acrylate, stearyl acrylate, tridecyl acrylate, lauryl acrylate, tetradecyl acrylate, pentadecyl acrylate, hexyldecyl acrylate, heptadecyl acrylate, and octylnonyl acrylate, and the like. Among them, isostearyl acrylate, tridecyl acrylate, lauryl acrylate, and tetradecyl acrylate are preferable. The ingredient (b2) may be used singly or as a mixture of two or more kinds thereof. The commercially available product of the ingredient (b2) is not particularly limited, and examples thereof include ISTA (isostearyl acrylate, manufactured by OSAKA ORGANIC CHEMICAL INDUSTRY LTD.), STA (stearyl acrylate, manufactured by OSAKA ORGANIC CHEMICAL INDUSTRY LTD.), SR489D (tridecyl acrylate, manufactured by Sartomer USA, LLC), LA (lauryl acrylate, manufactured by BASF SE), L-A (lauryl acrylate, manufactured by KYOEISHA CHEMICAL Co., LTD.), and the like.

As for the blending amount of the ingredient (B), it is preferable that the content of the ingredient (b1) is in a range of 20 to 95 parts by mass and the content of the ingredient (b2) is in a range of 3 to 70 parts by mass, relative to 100 parts by mass of the ingredient (A). It is more preferable that the content of the ingredient (b1) is in a range of 30 to 90 parts by mass and the content of the ingredient (b2) is in a range of 5 to 60 parts by mass, relative to 100 parts by mass of the ingredient (A). It is still more preferable that the content of the ingredient (b1) is in a range of 40 to 85 parts by mass and the content of the ingredient (b2) is in a range of 7 to 50 parts by mass, relative to 100 parts by mass of the ingredient (A). It is yet still more preferable that the content of the ingredient (b1) is in a range of 44 to 78 parts by mass and the content of the ingredient (b2) is in a range of 9 to 44 parts by mass, relative to 100 parts by mass of the ingredient (A). When the blending amount is within the above range, it is possible to provide a photocurable resin composition having a high curing degree after irradiation with light while having lower viscosity and maintaining cured material characteristics such as high extensibility and high strength. When plural kinds of the ingredients (A) are used, the total amount of the ingredients (A) preferably satisfy the above relationship. Similarly, when plural kinds of the ingredients (b1) or plural kinds of the ingredients (b2) are used, it is preferable that the total amount of the ingredients satisfy the above relationship.

<Ingredient (C)>

The photo-radical polymerization initiator of the ingredient (C) used in the present invention is not limited as long as it is a compound that can generate radicals by irradiation with active energy rays. Here, the active energy rays include all light in a broad sense including radioactive rays such as α-rays and β-rays, electromagnetic waves such as γ-rays and X-rays, electron beams (EB), ultraviolet rays having a wavelength of about 100 to 400 nm, visible light rays having a wavelength of about 400 to 800 nm, and the like, and are preferably ultraviolet rays. Examples of the ingredient (C) include acetophenone-based photo-radical polymerization initiators, benzoin-based photo-radical polymerization initiators, benzophenone-based photo-radical polymerization initiators, thioxanthone-based photo-radical polymerization initiators, acylphosphine oxide-based photo-radical polymerization initiators, titanocene-based photo-radical polymerization initiators, and the like. Among them, the acetophenone-based photo-radical polymerization initiators and acylphosphine oxide-based photo-radical polymerization initiators are preferable from the viewpoint of obtaining a photocurable resin composition that can be photo-cured in a short time by irradiation with active energy rays. Further, these photo-radical polymerization initiators may be used singly or in combination of two or more kinds thereof.

Examples of the acetophenone-based photo-radical polymerization initiators include, but not limited to, diethoxyacetophenone, 1-phenyl-2-hydroxy-2-methylpropan-1-one, benzyl dimethyl ketal, 4-(2-hydroxyethoxy)phenyl-(2-hydroxy-2-propyl) ketone, 1-hydroxy-cyclohexyl-phenyl-ketone, 2-methyl-2-morpholino(4-thiomethylphenyl)propan-1-one, 2-benzyl-2-dimethylamino-1-(4-morpholinophenyl)butanone, 2-hydroxy-2-methyl-1-[4-(1-methylvinyl)phenyl]propanone oligomer, and the like. Examples of commercially available products of the acetophenone-based photo-radical polymerization initiator include Omnirad (registered trademark, the same applies hereinafter.) 184, Omnirad 1173, Omnirad 2959, Omnirad 127 (manufactured by IGM Resins B. V.), and ESACURE (registered trademark) KIP-150 (manufactured by IGM Resins B.V.).

Examples of the acylphosphine oxide-based photo-radical polymerization initiator include, but not limited to, bis(2,4,6-trimethylbenzoyl)-phenyl-phosphine oxide, 2,4,6-trimethylbenzoyl-diphenyl-phosphine oxide, and the like. Examples of commercially available products of the acylphosphine oxide-based photo-radical polymerization initiator include Omnirad TPO, Omnirad 819, and Omnirad 819 DW (manufactured by IGM Resins B. V.).

The blending amount of the ingredient (C) is not particularly limited, and is preferably 0.1 to 20 parts by mass, more preferably 0.5 to 15 parts by mass, and particularly preferably 1.1 to 10 parts by mass, relative to 100 parts by mass of the ingredient (A). When the blending amount is within the above range, it is possible to provide a photocurable resin composition that is more applicable to coating using screen printing and can be photo-cured in a short time. When plural kinds of the ingredients (A) are used, the total amount of the ingredients (A) preferably satisfy the above relationship. Similarly, when plural kinds of the ingredients (C) are used, the total amount of the ingredients (C) preferably satisfies the above relationship.

<Optional Ingredients>

Additives can be used in the composition of the present invention as long as the additives do not hinder the object of the present invention. The additives include oligomers or polymers having a (meth)acryloyl group (not including the ingredient (A) of the present invention), (meth)acrylate monomers other than the ingredient (B), inorganic fillers, organic peroxides, curing accelerators, preservation stabilizers, antioxidants, photo-stabilizers, plasticizers, pigments, flame retardants, surfactants, and the like.

Examples of the oligomers or polymers having (meth)acryloyl groups (not including the ingredient (A) of the present invention) include, but not particularly limited to, urethane(meth)acrylates having a polybutadiene skeleton, urethane(meth)acrylates having a hydrogenated polybutadiene skeleton, urethane(meth)acrylates having a polycarbonate skeleton, urethane(meth)acrylates having a polyether skeleton, urethane(meth)acrylates having a polyester skeleton, urethane(meth)acrylates having a castor oil skeleton, isoprene-based (meth)acrylates, hydrogenated isoprene-based (meth)acrylates, epoxy(meth)acrylates, (meth)acryl group-containing acrylic polymers, and the like. Among them, the urethane(meth)acrylates having a polybutadiene skeleton, the urethane(meth)acrylates having a hydrogenated polybutadiene skeleton, the urethane(meth)acrylates having a castor oil skeleton, the isoprene-based (meth)acrylates, and the hydrogenated isoprene-based (meth)acrylates are preferable because they are excellent in compatibility with the ingredient (A) and the ingredient (B) of the present invention. Note that, in the present invention, oligomers refer to compounds which have repeating units of monomers on the main chain and are comprised of 2 to 100 repeating units. Further, these additives may be used singly or in combination of two or more kinds thereof. Furthermore, the (meth)acrylate monomer other than the ingredient (B) may be contained as long as it does not hinder the object of the present invention, but it is preferably not contained when it hinders the object.

For the purpose of improving the elastic modulus, fluidity, and the like of the cured material, the photocurable resin composition of the present invention may contain inorganic fillers to an extent that does not impair the storage stability. Specific examples thereof include inorganic powders, metallic powders, and the like. Examples of fillers of inorganic powders include glass, fumed silica, alumina, mica, ceramics, silicone rubber powders, calcium carbonate, aluminum nitride, carbon powders, kaolin clay, dried clay minerals, dried diatomaceous earth, and the like. The blending amount of the inorganic powder is preferably about 0.1 to 100 parts by mass relative to 100 parts by mass of the ingredient (A).

Fumed silica can be blended for the purpose of adjusting the viscosity of the photocurable resin composition or improving the mechanical strength of the cured material. Preferably, it is possible to use ones hydrophobically treated with organochlorosilanes, polyorganosiloxane, hexamethyldisilazane, or the like. Specific examples of the fumed silica include, for example, commercially available products manufactured by NIPPON AEROSIL CO., LTD., such as trade name AEROSIL (registered trademark) R 974, R 972, R 972 V, R 972 CF, R 805, R 812, R 812 S, R 816, R 8200, RY 200, RX 200, RY 200 S, and R 202.

The photocurable resin composition of the present invention may contain an organic peroxide for the purpose of imparting curability by heat or redox reaction. Use of a redox reaction is preferable because radical species can be generated at room temperature. The organic peroxide is not particularly limited, and examples thereof include ketone peroxides such as methylethylketone peroxide, cyclohexanone peroxide, 3,3,5-trimethylcyclohexanone peroxide, methylcyclohexanone peroxide, methyl acetoacetate peroxide, and acetylacetone peroxide; peroxy ketals such as 1,1-bis(t-butylperoxy)-3,3,5-trimethyl cyclohexane, 1,1-bis (t-butylperoxy)cyclohexane, 2,2-bis(t-butylperoxy)octane, n-butyl-4,4-bis(t-butylperoxy)valerate, and 2,2-bis(t-butylperoxy)butane; hydroperoxides such as t-butyl hydroperoxide, cumene hydroperoxide, diisopropylbenzene hydroperoxide, p-menthane hydroperoxide, 2,5-dimethylhexane-2,5-dihydroperoxide, and 1,1,3,3-tetramethylbutyl hydroperoxide; dialkyl peroxides such as di-t-butyl peroxide, t-butylcumyl peroxide, dicumyl peroxide, α,α'-bis(t-butylperoxy-m-isopropyl)benzene, 2,5-dimethyl-2,5-di(t-butylperoxy)hexane, and 2,5-dimethyl-2,5-di(t-butylperoxy)hexyne-3; diacyl peroxides such as acetyl peroxide, isobutyryl peroxide, octanoyl peroxide, decanoyl peroxide, lauroyl peroxide, 3,5,5-trimethylhexanoyl peroxide, succinic acid peroxide, benzoyl peroxide, 2,4-dichloro benzoyl peroxide, and m-toluoyl peroxide; peroxy dicarbonates such as diisopropyl peroxy dicarbonate, di-2-ethylhexyl peroxy dicarbonate, di-n-propyl peroxy dicarbonate, bis-(4-t-butylcyclohexyl)peroxy dicarbonate, dimyristyl peroxy dicarbonate, di-2-ethoxyethyl peroxy dicarbonate, dimethoxy isopropyl peroxy dicarbonate, di(3-methyl-3-methoxybutyl)peroxy dicarbonate, and diallyl peroxy dicarbonate; peroxyesters such as t-butyl peroxy acetate, t-butyl peroxy isobutyrate, t-butyl peroxy pivalate, t-butyl peroxy neodecanoate, cumyl peroxy neodecanoate, t-butyl peroxy-2-ethylhexanoate, t-butylperoxy-3,5,5-trimethylhexanoate, t-butyl peroxy laurate, t-butyl peroxy benzoate, di-t-butyl peroxy isophthalate, 2,5-dimethyl-2,5-di(benzoylperoxy)hexane, t-butyl peroxy maleic acid, t-butyl peroxy isopropyl carbonate, cumyl peroxy octoate, t-hexyl peroxy neodecanoate, t-hexyl peroxy pivalate, t-butyl peroxy neohexanoate, t-hexyl peroxy neohexanoate, and cumyl peroxy neohexanoate; acetyl cyclohexyl sulfonyl peroxide; t-butyl peroxy allylcarbonate; and the like. These organic peroxides may be used singly or in combination of two or more kinds thereof. Among them, the cumene hydroperoxide is preferably used from the viewpoint of curability.

When an organic peroxide is used in the present invention, a curing accelerator may be blended for the purpose of accelerating the redox reaction. Such a curing accelerator is not particularly limited, and saccharin (o-benzoic sulfimid), a hydrazine compound, an amine compound, a mercaptan compound, a transition metal-containing compound, or the like is preferably used.

Examples of the hydrazine compound include 1-acetyl-2-phenyl hydrazine, 1-acetyl-2(p-tolyl)hydrazine, 1-benzoyl-2-phenyl hydrazine, trifluoro)acetyl-2-phenyl hydrazine, 1,5-diphenyl-carbohydrazine, 1-formyl-2-phenyl hydrazine, 1-acetyl-2-(p-bromophenyl) hydra zine, 1-acetyl-2-(p-nitrophenyl)hydrazine, 1-acetyl-2-(2'-phenylethylhydrazine), ethylcarbazate, p-nitrophenyl hydrazine, p-trisulfonyl hydrazide, and the like.

Examples of the amine compound include 2-ethylhexylamine; heterocyclic secondary amines such as 1,2,3,4-tetrahydroquinaldine; heterocyclic tertiary amines such as quinoline, methylquinoline, quinaldine, quinoxaline and phenazine; aromatic tertiary amines such as N,N-dimethyl-para-toluidine, N,N-dimethyl-anisidine, and N,N-dimethyl-aniline; azole-based compounds such as 1,2,4-triazole, oxazole, oxadiazole, thiadiazole, benzotriazole, hydroxybenzotriazole, benzoxazole, 1,2,3-benzothiadiazole, and 3-mercaptobenzotrizole; and the like.

Examples of the mercaptan compound include n-dodecyl mercaptan, ethylmercaptan, butylmercaptan, tris-[(3-mercaptopropionyloxy)-ethyl]-isocyanurate, pentaerythritol tetrakis(3-mercaptopropionate), dipentaerythritol hexakis(3-mercaptopropionate), trimethylolpropane tris(3-mercaptopropionate), trimethylolpropane tris(thioglycolate), pentaerythritol tetrakis(thioglycolate), and the like.

As the transition metal-containing compound, a metal chelate complex salt is preferably used. Examples thereof include pentadione iron, pentadione cobalt, pentadione copper, propylenediamine copper, ethylenediamine copper, iron naphthate, nickel naphthate, cobalt naphthate, copper naphthate, copper octate, iron hexoate, iron propionate, acetylacetone vanadium, and the like.

The above-described curing accelerators may be used singly or in combination of two or more kinds thereof. Among them, the saccharin, the hydrazine-based compound, a mixture of the amine-based compound and the transition metal-containing compound are more preferable because a good curing acceleration effect can be obtained.

The photocurable resin composition of the present invention may contain a preservation stabilizer. As the preservation stabilizer, radical absorbers such as benzoquinone, hydroquinone, and hydroquinone monomethyl ether, metal chelating agents such as ethylenediaminetetraacetic acid or 2-sodium salts thereof, oxalic acid, acetylacetone, o-aminophenol, and the like can also be used.

The photocurable resin composition of the present invention may contain an antioxidant. Examples of the antioxidant include quinone-based compounds such as β-naphthoquinone, 2-methoxy-1,4-naphthoquinone, methyl hydroquinone, hydroquinone, hydroquinone monomethyl ether, mono-tert-butyl hydroquinone, 2,5-di-tert-butyl hydroquinone, p-benzoquinone, 2,5-diphenyl-p-benzoquinone, and 2,5-di-tert-butyl-p-benzoquinone; phenols such as 2,2-methylene-bis(4-methyl-6-tert-butylphenol), catechol, tert-butyl catechol, 2-butyl-4-hydroxyanisole, 2,6-di-tert-butyl-p-cresol, 2-tert-butyl-6-(3-tert-butyl-2-hydroxy-5-methylbenzyl)-4-methylphenyl acrylate, 2-[1-(2-hydroxy-3, 5-di-tert-pentylphenyl)ethyl]-4,6-di-tert-pentylphenyl acrylate, 4,4'-butylidenebis(6-tert-butyl-3-methyl phenol), 4,4'-thiobis(6-tert-butyl-3-methyl phenol), 3,9-bis[2-[3-(3-tert-butyl-4-hydroxy-5-methylphenyl)propionyloxy]-1,1-dimethylethyl]-2,4,8,10-tetraoxaspiro[5,5]undecane, pentaerythritol tetrakis[3-(3,5-di-tert-butyl-4-hydroxyphenyl) propionate], thiodiethylene bis[3-(3,5-di-tert-butyl-4-hydroxyphenyl)propionate], octadecyl-3-(3,5-di-tert-butyl-4-hydroxyphenyl)propionate, N,N'-hexane-1,6-diylbis[3-(3, 5-di-tert-butyl-4-hydroxyphenyl)propionamide], benzene propanoic acid, 3,5-bis(1,1-dimethylethyl)-4-hydroxy, C7-C9 side chain alkyl ester, 2,4-dimethyl-6-(1-methylpentadecyl)phenol, diethyl[[3,5-bis(1,1-dimethylethyl)-4-hydroxyphenyl]methyl]phosphonate, 3,3',3'', 5,5',5''-hexa-tert-butyl-a,a',a''-(mesitylene-2,4,6-tolyl)tri-p-cresol, calcium diethyl bis[[3,5-bis(1,1-dimethylethyl)-4-hydroxyphenyl] methyl]phosphonate, 4,6-bis(octylthiomethyl)-o-cresol, ethylenebis(oxyethylene)bis[3-(5-tert-butyl-4-hydroxy-m-tolyl)propionate], hexamethylenebis[3-(3,5-di-tert-butyl-4-hydroxyphenyl)propionate, 1,3,5-tris(3,5-di-tert-butyl-4-hydroxybenzyl)-1,3,5-triazine-2,4,6(1H,3H,5H)-trione, 1,3, 5-tris[(4-tert-butyl-3-hydroxy-2,6-xylyl)methyl]-1,3,5-triazine-2,4,6-(1H,3H,5H)-trione, a reaction product of N-phenylbenzenamine and 2,4,6-trimethylpentene, 2,6-di-tert-butyl-4-(4,6-bis(octylthio)-1,3,5-triazine-2-ylamino) phenol, and picric acid; phosphorus-based compounds such as tris(2,4-di-tert-butylphenyl)phosphite, tris[2-[[2,4,8,10-tetra-tert-butyldibenzo[d,f][1,3,2]dioxaphosphefin-6-yl] oxy]ethyl]amine, bis(2,4-di-tert-butylphenyl)pentaerythritol diphosphite, bis[2,4-bis(1,1-dimethylethyl)-6-methylphenyl]ethyl ester phosphorous acid, tetrakis(2,4-di-tert-butylphenyl) [1,1-bisphenyl]-4,4'-diyl bisphosphonite, 6-[3-

(3-tert-butyl-4-hydroxy-5-methylphenyl)propoxy]-2,4,8,10-tetra-tert-butyl dibenz[d,f][1,3,2]dioxaphosphefin; sulfur-based compounds such as dilauryl-3,3'-thiodipropionate, dimyristyl-3,3'-thiodipropionate, distearyl-3,3'-thiodipropionate, pentaerythrityl tetrakis(3-lauryl thiopropionate), and 2-mercaptobenzimidazole; amine-based compounds such as phenothiazine; lactone-based compounds; vitamin E-based compounds; and the like. Among them, phenol-based compounds are preferable.

The photocurable resin composition of the present invention may contain a photo-stabilizer. Examples of the photo-stabilizer include hindered amine-based compounds such as bis(2,2,6,6-tetramethyl-4-piperidyl)sebacate, bis(1,2,2,6,6-pentamethyl-4-piperidyl)sebacate, 4-benzoyloxy-2,2,6,6-tetramethylpiperidine, 1-[2-[3-(3,5-di-tert-butyl-4-hydroxyphenyl)propionyloxy]ethyl]-4-[3-(3,5-di-tert-butyl-4-hydroxyphenyl)propionyloxy]-2,2,6,6-tetramethylpiperidine, 1,2,2,6,6-pentamethyl-4-piperidinylmethacrylate, bis(1,2,2,6,6-pentamethyl-4-piperidinyl) [[3,5-bis(1,1-dimethylethyl)-4-hydroxyphenyl]methyl]butyl malonate, decanedioic acid bis(2,2,6,6-tetramethyl-1(octyloxy)-4-piperidinyl)ester, a reaction product of 1,1-dimethylethyl hydroperoxide and octane, N,N',N",N'''-tetrakis-(4,6-bis-(butyl-(N-methyl-2,2,6,6-tetramethylpiperidine-4-yl)amino)-triazine-2-yl)-4,7-diazadecane-1,10-diamine, a polycondensate of N-(2,2,6,6-tetramethyl-4-piperidyl)butylamine with dibutylamine.1,3,5-triazine.N,N'-bis(2,2,6,6-tetramethyl-4-piperidyl-1,6-hexamethylene diamine, poly[[6-(1,1,3,3-tetramethylbutyl)amino-1,3,5-triazine-2,4-diyl][(2,2,6,6-tetramethyl-4-piperidyl)imino]hexamethylene[(2,2,6,6-tetramethyl-4-piperidyl)imino]], a polymer of dimethyl succinate and 4-hydroxy-2,2,6,6-tetramethyl-1-piperidine ethanol, 2,2,4,4-tetramethyl-20-(β-lauryloxycarbonyl)ethyl-7-oxa-3,20-diazadispiro[5,1,11,2]heneicosan-21-one, β-alanine-N-(2,2,6,6-tetramethyl-4-piperidinyl)-dodecyl ester/tetradecyl ester, N-acetyl-3-dodecyl-1-(2,2,6,6-tetramethyl-4-piperidinyl)pyrrolidine-2,5-dione, 2,2,4,4-tetramethyl-7-oxa-3,20-diazadispiro[5,1,11,2]heneicosan-21-one, 2,2,4,4-tetramethyl-21-oxa-3,20-diazacyclo-[5,1,11,2]— heneicosan-20-propanoic acid dodecyl ester/tetradecyl ester, propanedioic acid [(4-methoxyphenyl)-methylene]— bis(1,2,2,6,6-pentamethyl-4-piperidinyl)ester, higher fatty acid esters of 2,2,6,6-tetramethyl-4-piperidinol, 1,3-benzenedicarboxamide, N,N'-bis(2,2,6,6-tetramethyl-4-piperidinyl); benzophenone-based compounds such as octabenzone; benzotriazole-based compounds such as 2-(2H-benzotriazole-2-yl)-4-(1,1,3,3-tetramethylbutyl)phenol, 2-(2-hydroxy-5-methylphenyl)benzotriazole, 2-[2-hydroxy-3-(3,4,5,6-tetrahydrophthalimide-methyl)-5-methylphenyl]benzotriazole, 2-(3-tert-butyl-2-hydroxy-5-methylphenyl)-5-chlorobenzotriazole, 2-(2-hydroxy-3,5-di-tert-pentylphenyl)benzotriazole, a reaction product of methyl 3-(3-(2H-benzotriazole-2-yl)-5-tert-butyl-4-hydroxyphenyl)propionate and polyethylene glycol, 2-(2H-benzotriazole-2-yl)-6-dodecyl-4-methyl phenol; benzoate-based compounds such as 2,4-di-tert-butylphenyl-3,5-di-tert-butyl-4-hydroxybenzoate; triazine-based compounds such as 2-(4,6-diphenyl-1,3,5-triazine-2-yl)-5-[(hexyl)oxy] phenol; and the like. Hindered amine-based compounds are particularly preferable.

The photocurable resin composition of the present invention may contain an adhesion promoter. Examples of the adhesion promoter include 3-methacryloxypropylmethyldimethoxysilane, 3-methacryloxypropyltrimethoxysilane, 3-methacryloxypropylmethyldiethoxysilane, 3-methacryloxypropyltriethoxysilane, 3-acryloxypropyltrimethoxysilane, methacryloxyoctyl trimethoxysilane, vinyl trimethoxysilane, vinyl trichlorosilane, vinyl triethoxysilane, vinyltris(β-methoxyethoxy)silane, γ-chloropropyltrimethoxysilane, β-(3,4-epoxycyclohexyl)ethyltrimethoxysilane, γ-glycidoxypropyltrimethoxysilane, γ-mercaptopropyltrimethoxysilane, γ-aminopropyltriethoxysilane, N-β-(aminoethyl)-γ-aminopropyltrimethoxysilane, N-β-(aminoethyl)-γ-aminopropylmethyldimethoxysilane, γ-ureidopropyltriethoxysilane, hydroxyethyl methacrylate phosphate ester, methacryloxyoxyethyl acid phosphate, methacryloxyoxyethyl acid phosphate monoethylamine half salt, 2-hydroxyethyl methacrylic acid phosphate, and the like. Among them, hydroxyethyl methacrylate phosphate ester, methacryloxyoxyethyl acid phosphate, methacryloxyoxyethyl acid phosphate monoethylamine half salt, 2-hydroxyethyl methacrylic acid phosphate, and the like are preferable. The content of the adhesion promoter is preferably 0.05 to 30 parts by mass, and more preferably 0.2 to 10 parts by mass relative to 100 parts by mass of the ingredient (A).

The photocurable resin composition of the present invention can be produced by a conventionally known method. For example, it is possible to produce the photocurable resin composition by blending predetermined amounts of the ingredients (A) to (C), and as necessary, optional ingredients, followed by mixing at a temperature of preferably 10 to 70° C. for preferably 0.1 to 5 hours using a mixing unit such as a mixer. In addition, the production is conducted preferably under a light-shielding environment.

<Application Method>

As a method for applying the photocurable resin composition of the present invention to an adherend, for example, it is possible to use a method such as dispensing using an automatic coater, spraying, inkjet, screen printing, gravure printing, dipping, or spin coating. Among them, the photocurable resin composition of the present invention is most suitable for screen printing since the photocurable resin composition of the present invention is a low-viscosity photocurable resin composition having a high curing degree after irradiation with light while maintaining cured material characteristics such as high extensibility and high strength. Note that the photocurable resin composition of the present invention is preferably in a liquid state at 25° C. from the viewpoint of easiness in application.

<Curing Method>

An active energy ray source for curing the photocurable resin composition of the present invention by irradiating the photocurable resin composition with active energy rays such as ultraviolet rays and visible light rays is not particularly limited, and examples thereof include low-pressure mercury lamps, medium pressure mercury lamps, high-pressure mercury lamps, extra high pressure mercury lamps, black light lamps, microwave-excited mercury lamps, metal halide lamps, sodium lamps, halogen lamps, xenon lamps, LEDs, fluorescent lamps, sunlight, electron beam irradiation devices, and the like. The irradiation dose of irradiation with active energy rays is preferably 3 $kJ/m^2$ or more, more preferably 5 $kJ/m^2$ or more from the viewpoint of the characteristics of the cured material, and is preferably 70 $kJ/m^2$ or less, more preferably 60 $kJ/m^2$ or less, and particularly preferably 50 $kJ/m^2$ or less from the viewpoint of the takt time in the curing step.

A curing degree of the photocurable resin composition of the present invention is not particularly limited, but the curing degree is preferably 75% or more, more preferably 77% or more, and still more preferably 80% or more. Note that, as the curing degree, a value measured by a method described in Examples to be described later is employed.

<Cured Material>

A cured material of the present invention can be obtained by curing the photocurable resin composition of the present invention in the above curing method by irradiation with active energy rays such as ultraviolet rays. The cured material of the present invention may be any cured material obtained by curing the photocurable resin composition of the present invention regardless of a curing method employed.

A hardness of the cured material of the present invention or the cured material obtained by curing the photocurable resin composition of the present invention is not particularly limited, but the hardness is preferably 3 to 95 and more preferably 5 to 90. Note that, as the hardness of the cured material, a value measured by a method described in Examples to be described later is employed.

A tensile strength of the cured material of the present invention or the cured material obtained by curing the photocurable resin composition of the present invention is not particularly limited, but the tensile strength is preferably 1.2 MPa or more, and more preferably 1.7 MPa or more. Note that, as the tensile strength of the cured material, a value measured by a method described in Examples to be described later is employed.

An elongation of the cured material of the present invention or the cured material obtained by curing the photocurable resin composition of the present invention is not particularly limited, but the elongation is preferably 310% or more, and more preferably 350% or more. Note that, as the elongation of the cured material, a value measured by a method described in Examples to be described later is employed.

<Usage and Sealing Agent>

A preferred usage of the photocurable resin composition of the present invention or a cured material thereof is a curable sealing agent. In the present invention, the sealing agent includes usages such as adhesives, coating agents, casting agents, and potting agents. When used in the above usages, the photocurable resin composition of the present invention is preferably in a liquid state at 25° C.

Since the photocurable resin composition of the present invention or a cured material thereof is a rubber elastic body excellent in low gas permeability, low moisture permeability, heat resistance, acid resistance, and flexibility, specific usages of the sealing agents include stacked bodies for fuel cells, solar cells, dye-sensitized solar cells, lithium ion cells, electrolytic capacitors, liquid crystal displays, organic EL displays, electronic paper, LEDs, hard disk devices, photodiodes, optical communication/circuits, electric wires/cables/optical fibers, optical isolators, IC cards, and the like; sensors; substrates; and pharmaceutical and medical instruments and devices; and the like. Among these usages, the usage for fuel cells is particularly preferable because the photocurable resin composition of the present invention rapidly cures by irradiation with active energy rays such as ultraviolet rays, and a cured material thereof is excellent in gas barrier property.

<Fuel Cell>

The fuel cell is a power generator that generates electricity by chemically reacting hydrogen with oxygen. Further, as for fuel cells, there are four types including a polymer electrolyte fuel cell, a phosphoric acid fuel cell, a molten carbonate fuel cell, and a solid oxide fuel cell. Among them, the polymer electrolyte fuel cell achieves high power generation efficiency while having a relatively low operating temperature (around 80° C.), and therefore is used for applications such as power sources for automobiles, power generators for households, small power sources for electronic devices such as mobile phones, and power sources for emergency.

Figure 2:
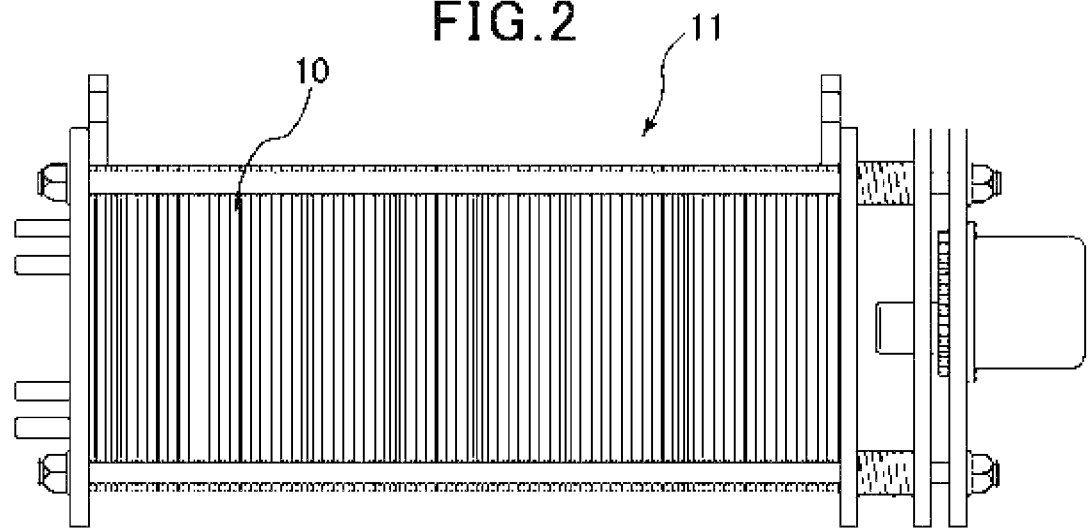
FIG. 2 is a schematic view illustrating the entire fuel cell.

As illustrated in FIG. 1, the cell 1 of the typical polymer electrolyte fuel cell has the structure including: the electrolyte membrane electrode assembly 5 (MEA) structured such that the polymer electrolyte membrane 4 is nipped between the air electrode 3 a and the fuel electrode 3b; the frame 6 supporting the MEA 5; and the separators 2 in which the gas flow paths are formed. Further, when activating the polymer electrolyte fuel cell, a fuel gas (hydrogen gas) and an oxidation gas (oxygen gas) are supplied through an oxidation gas flow path 8a and a fuel gas flow path 8b. Furthermore, cooling water flows through a flow path 9 for the purpose of suppressing heat generation during power generation. Note that a package including several hundreds of such cells stacked on one another is referred to as a cell stack 10 of a polymer electrolyte fuel cell 11 as illustrated in FIG. 2.

When the fuel gas (hydrogen gas) is supplied to the fuel electrode and the oxidation gas (oxygen gas) is supplied to the oxygen electrode (air electrode), the following reactions occur at the respective electrodes, and a reaction to generate water ($H_2 + \frac{1}{2}O_2 \rightarrow H_2O$) occurs as a whole. To be more specific, protons ($H^+$) generated at the fuel electrode as described below are diffused inside the polymer electrolyte membrane to move to the oxygen electrode side, and water ($H_2O$) generated by reaction with the oxygen is discharged from the oxygen electrode side.

$H_2 \rightarrow 2H^+ + 2e^-$ <span style="float:right">Fuel electrode (anode):</span>

$\frac{1}{2}O_2 + 2H^+ + 2e^- \rightarrow H_2O$ <span style="float:right">Oxygen electrode (cathode):</span>

In order to activate the polymer electrolyte fuel cell, it is necessary to supply the anode with a fuel gas containing hydrogen and supply the cathode with an oxidation gas containing oxygen in such a separated manner that these gases are isolated from each other. This is because there is a risk of lowering the power generation efficiency if one of the gases is mixed with the other gas due to insufficiency of the isolation. Against such a background, a sealing agent is used in many portions for the purpose of preventing leakage of the fuel gas, the oxygen gas, and the like. Specifically, the sealing agent is used between adjacent separators, between a separator and a frame, between a frame and a polymer electrolyte membrane or MEA, or the like.

The sealing agent of the present invention can be suitably used as a curable sealing agent for a fuel cell for a periphery of one or more members selected from the group consisting of a separator, a frame, a polymer electrolyte membrane, a fuel electrode, an air electrode, and an electrolyte membrane electrode assembly, which are members in a fuel cell. In particular, the sealing agent of the present invention can be suitably used as a sealing agent between adjacent separators in the fuel cell or a sealing agent between a frame and a polymer electrolyte membrane or an electrolyte membrane electrode assembly in the fuel cell.

Examples of the polymer electrolyte membrane 4 include a cation exchange membrane having ion conductivity, and preferred examples thereof include, for example, a fluorine-based polymer having a sulfonic acid group represented by the following Formula (3) because it is chemically stable and resistant to operation at a high temperature. Examples of commercially available products thereof include Nafion (registered trademark) manufactured by DuPont, Flemion (registered trademark) manufactured by AGC Inc., Aciplex (registered trademark) manufactured by Asahi Kasei Corporation, and the like. Although a material of a polymer electrolyte membrane generally has properties difficult to bond, use of the photocurable resin composition of the present invention makes it possible to bond the polymer electrolyte membrane.

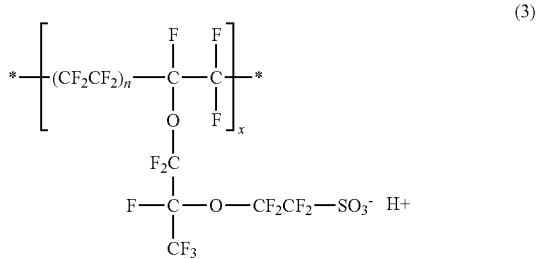

(3)

The fuel electrode 3*b* is called a hydrogen electrode or an anode, and a known electrode is used as the fuel electrode. For example, an electrode in which a catalyst such as platinum, nickel, or ruthenium is supported on carbon may be used. Further, the air electrode 3*a* is called an oxygen electrode or a cathode, and a known electrode is used as the air electrode. For example, an electrode in which a catalyst such as platinum or an alloy is supported on carbon may be used. The surface of each electrode may be provided with a gas diffusion layer which functions to diffuse gas or moisturize the polymer electrolyte membrane. As the gas diffusion layer, a known layer is used, and examples thereof include carbon paper, carbon cloth, carbon fiber, and the like.

As illustrated in FIG. 1, each of the separators 2 is provided with finely-ribbed flow paths, through each of which a fuel gas or an oxidation gas is supplied to the corresponding electrode. Further, the separator 2 is made of aluminum, stainless steel, titanium, graphite, carbon, or the like.

The frame 6 supports and reinforces the polymer electrolyte membrane 4 or the MEA 5, which is a thin membrane, so as not to break the polymer electrolyte membrane 4 or the MEA 5. Examples of materials for the frame 6 include thermoplastic resins such as polyvinyl chloride, polyethylene naphthalate (PEN), polyethylene terephthalate, polypropylene, and polycarbonate. Further, members are preferably light-transmissive in order to bond the members together by using the photocurable resin composition of the present invention or a cured material thereof.

The fuel cell of the present invention is a fuel cell sealed with the photocurable resin composition of the present invention or a cured material thereof. Examples of the members needed to be sealed in a fuel cell include the separator, the frame, the polymer electrolyte membrane, the fuel electrode, the air electrode, the MEA, and the like. A sealing portion may be formed between these members. More specifically, a place being sealed (place where the sealing portion is formed) is, for example, a place between the separators adjacent to each other, a place between the separator and the frame, and a place between the frame and the polymer electrolyte membrane or the MEA.

A cured material can be obtained by curing the photocurable resin composition of the present invention or the sealing agent of the present invention by irradiation with energy rays such as light. The photocurable resin composition or the sealing agent of the present invention or the cured material thereof may be used as a sealing portion for a periphery of members such as a separator, a frame, a polymer electrolyte membrane, a fuel electrodes, an air electrodes, and an electrolyte membrane electrode assembly for a fuel cell.

The photocurable resin composition or the sealing agent of the present invention or the cured material thereof can be suitably used for a sealing portion between adjacent separators in the fuel cell or a sealing portion between a frame and a polymer electrolyte membrane or an electrolyte membrane electrode assembly in the fuel cell.

The main purpose of sealing "between the separator and the frame" or "between the polymer electrolyte membrane or the MEA and the frame" is to prevent mixing or leakage of the gases, and the sealing between the adjacent separators is provided in order to prevent leakage of the gas and to prevent leakage of the cooling water to the outside from the cooling water flow path. Note that the atmosphere becomes strongly acidic due to the acid generated from the polymer electrolyte membrane, acid resistance is required for the sealing agent.

<Sealing Method>

A sealing method using the photocurable resin composition of the present invention is not particularly limited, and typical examples thereof include a form-in-place gasket (FIPG) method, a cure-in-place gasket (CIPG) method, a mold-in-place gasket (MIPG) method, a liquid injection molding method, and the like.

The FIPG method is an adhesive sealing method including: applying the photocurable resin composition to one of flanges of seal target components by an automatic coater or the like; and curing the photocurable resin composition by irradiating the photocurable resin composition, in a state where the flange is stuck on another flange, with active energy rays such as ultraviolet rays from the light-transmissive flange side. The method may be used in sealing at least part of at least two flanges of seal target components including the at least two flanges. At this time, at least one of the flanges allows light of active energy rays to pass therethrough. The method includes: applying the photocurable resin composition of the present invention to a surface of at least one of the flanges; sticking the one flange onto the other flange with the photocurable resin composition interposed therebetween; and curing the photocurable resin composition by irradiating the photocurable resin composition with active energy rays through the light-transmissive flange and sealing at least part of the at least two flanges.

That is, according to one embodiment of the present invention, there is provided a method for sealing at least part of two flanges, at least one of the flanges being an active-energy-ray-transmissive flange, the method including: applying the photocurable resin composition of the present invention to a surface of one of the flanges; sticking the one flange with the photocurable resin composition applied thereto onto the other flange with the photocurable resin composition interposed therebetween; and curing the photocurable resin composition by irradiating the photocurable resin composition with active energy rays through the active-energy-ray-transmissive flange and sealing the at least part of the two flanges.

CIPG is a method including: applying the photocurable resin composition in the form of a bead to a flange of a seal target component by a screen-printing machine, an automatic coater, or the like; forming a gasket by curing the photocurable resin composition by irradiation with active energy rays such as ultraviolet rays; and performing compression sealing with the flange stuck on another flange. The method may be used in sealing at least part of at least two flanges of seal target components including the at least two flanges. The method includes: applying the photocurable resin composition described above to at least one of the flanges; curing the photocurable resin composition by irradiating the applied photocurable resin composition with active energy rays and forming a gasket formed of a cured material of the photocurable resin composition; and placing the other flange on the gasket and sealing the at least part of the at least two flanges by pressure bonding the one flange with the photocurable resin composition applied thereto and the other flange together with the gasket interposed therebetween.

That is, according to one embodiment of the present invention, there is provided a method for sealing at least part of two flanges including: applying the photocurable resin composition to a surface of one of the flanges; curing the photocurable resin composition by irradiating the photocurable resin composition with active energy rays and forming a gasket formed of a cured material of the photocurable resin composition on the one flange; and placing the other flange on the gasket and sealing the at least part of the two flanges by pressure bonding the one flange and the other flange together with the gasket interposed therebetween.

MIPG is a method including: placing a mold made of an active-energy-ray-transmissive material in contact with one flange of a seal target component in advance; injecting the photocurable resin composition into a cavity formed between the mold and the flange and photo-curing the photocurable resin composition by irradiation with active energy rays such as ultraviolet rays to form a gasket; sticking the one flange onto the other flange; and compression sealing the flanges. Note that the mold is preferably made of a light-transmissive material, and specific examples thereof include glass, polymethyl methacrylate (PMMA), polycarbonate, cycloolefin polymer, olefin, and the like. Further, for easy demolding of the gasket from the mold after the formation of the gasket, it is preferable to apply a release agent such as a fluorine-based release agent or a silicone-based release agent on the mold in advance. The method may be used in sealing at least part of at least two flanges of seal target components including the at least two flanges. The method includes: placing a gasket formation mold on at least one of the flanges; injecting the photocurable resin composition described above into at least part of a cavity formed between the gasket formation mold and the flange on which the mold is placed; curing the photocurable resin composition by irradiating the photocurable resin composition with active energy rays and forming a gasket formed of a cured material of the photocurable resin composition; detaching the mold from the one flange; and placing the other flange on the gasket and sealing the at least part of the at least two flanges by pressure bonding the one flange and the other flange together with the gasket interposed therebetween.

That is, according to one embodiment of the present invention, there is provided a method for sealing at least part of two flanges including: placing a gasket formation mold on one of the flanges; injecting the photocurable resin composition according to the present invention into at least part of a cavity formed between the gasket formation mold and the one flange; curing the photocurable resin composition by irradiating the photocurable resin composition with active energy rays and forming a gasket formed of a cured material of the photocurable resin composition on the one flange; detaching the mold from the one flange; and placing the other flange on the gasket and sealing the at least part of the two flanges by pressure bonding the one flange and the other flange together with the gasket interposed therebetween. At this time, the gasket formation mold is preferably active-energy-ray-transmissive.

The liquid injection molding is a method including: injecting the photocurable resin composition into a mold made of a light-transmissive material with a specific pressure; and forming a gasket by photo-curing the photocurable resin composition by irradiation with active energy rays such as ultraviolet rays. Then, one flange is stuck on the other flange with the gasket interposed therebetween, and compression sealing is performed. Note that the mold is preferably made of a light-transmissive material, and specific examples thereof include glass, PMMA, polycarbonate, cycloolefin polymer, olefin, and the like. Further, for easy demolding of the gasket from the mold after the formation of the gasket, it is preferable to apply a release agent such as a fluorine-based release agent or a silicone-based release agent on the mold in advance.

EXAMPLES

Subsequently, the present invention is described in more detail with reference to Examples, however the present invention is not limited to these Examples.

<Production of Polyisobutylene Having Acryloyloxyethoxyphenyl Groups (a1)>

After replacing the inside of a 5 L separable flask with nitrogen, 200 mL of n-hexane and 2000 mL of butyl chloride were added, and the mixture was cooled to −70° C. with stirring under a nitrogen atmosphere. Then, 840 mL (9 mol) of isobutylene, 12 g (0.05 mol) of p-dicumyl chloride, and 1.1 g (0.012 mol) of 2-methylpyridine were added. After the reaction mixture was cooled to −70° C., 5.0 mL (0.05 mol) of titanium tetrachloride was added to initiate polymerization. 3 hours after the initiation of polymerization, 40 g of phenoxyethyl acrylate (LIGHT ACRYLATE PO-A, manufactured by KYOEISHA CHEMICAL Co., LTD.) and 110 ml of titanium tetrachloride were added. Thereafter, stirring was continued at −70° C. for 4 hours, and then 1000 ml of methanol was added to stop the reaction.

The supernatant liquid was separated from the reaction solution, and the solvent and the like were distilled off. Then, the product was dissolved in 3000 ml of n-hexane, washed with 3000 ml of pure water three times, and reprecipitated from methanol. After that, the solvent was distilled off under reduced pressure, and the obtained polymer was vacuum-dried at 80° C. for 24 hours to obtain a polyisobutylene having acryloyloxyethoxyphenyl groups (a1).

The ingredient (a1) contains a —[$CH_2C(CH_3)_2$]— unit and contains two acryloyl groups. More specifically, the ingredient (a1) is a polymer represented by the Formula (1) in which $R^1$ represents a phenylene group, PIB represents a polyisobutylene skeleton, $R^4$ represents a hydrocarbon group having 2 carbon atoms, $R^2$ and $R^3$ each independently represent a hydrogen atom, and $R^5$ represents a hydrogen atom. The number average molecular weight (on a polystyrene conversion basis measured using chromatography) of the ingredient (a1) was 11,100, and the viscosity (25° C.) of the ingredient (a1) was 1550 Pa·s.

Preparation of Photocurable Resin Composition

Example 1

100 parts by mass of the polyisobutylene having acryloyloxyethoxyphenyl groups (a1) as the ingredient (A), 78 parts by mass of isobornyl acrylate (IB-XA, manufactured by KYOEISHA CHEMICAL Co., LTD.) as the ingredient (b1-1), 9 parts by mass of n-lauryl acrylate (L-A, manufactured by KYOEISHA CHEMICAL Co., LTD.) as the ingredient (b2-1), and 8 parts by mass of 1-phenyl-2-hydroxy-2-methylpropane-1-one (Omnirad 1173, manufactured by IGM Resins B. V.) as the ingredient (C) of the present invention were added and mixed with a planetary mixer at ambient temperature (25° C.) for 60 minutes under a light-shielded condition to obtain a photocurable resin composition of Example 1.

Example 2

Example 2 was obtained in the same preparation method as in Example 1 except that the amount of (b1-1) was changed to 72 parts by mass and the amount of (b2-1) was changed to 16 parts by mass in Example 1.

Example 3

Example 3 was obtained in the same preparation method as in Example 1 except that the amount of (b1-1) was changed to 66 parts by mass and the amount of (b2-1) was changed to 22 parts by mass in Example 1.

Example 4

Example 4 was obtained in the same preparation method as in Example 1 except that the amount of (b1-1) was changed to 44 parts by mass and the amount of (b2-1) was changed to 44 parts by mass in Example 1.

Example 5

Example 5 was obtained in the same preparation method as in Example 3 except that dicyclopentanyl acrylate (FA-513AS, manufactured by Showa Denko Materials Co., Ltd.) was used as (b1-2) in place of (b1-1) in Example 3.

Example 6

Example 6 was obtained in the same preparation method as in Example 3 except that 4-tert-butylcyclohexyl acrylate (TBCHA, manufactured by KJ Chemicals Corporation) was used as (b1-3) in place of (b1-1) in Example 3.

Example 7

Example 7 was obtained in the same preparation method as in Example 3 except that isostearyl acrylate (ISTA, manufactured by OSAKA ORGANIC CHEMICAL INDUSTRY LTD.) was used as (b2-2) in place of (b2-1) in Example 3.

Comparative Example 1

Comparative Example 1 was obtained in the same preparation method as in Example 1 except that the amount of (b1-1) was changed to 88 parts by mass and (b2-1) was removed in Example 1.

Comparative Example 2

Comparative Example 2 was obtained in the same preparation method as in Example 1 except that (b1-1) was removed and the amount of (b2-1) was changed to 88 parts by mass in Example 1.

Comparative Example 3

Comparative Example 3 was obtained in the same preparation method as in Example 3 except that isobornyl methacrylate was used in place of (b1-1) in Example 3.

Comparative Example 4

Comparative Example 4 was obtained in the same preparation method as in Comparative Example 3 except that n-lauryl methacrylate was used in place of (b2-1) in Comparative Example 3.

Comparative Example 5

Comparative Example 5 was obtained in the same preparation method as in Example 3 except that phenoxyethyl acrylate was used in place of (b1-1) in Example 3.

The photocurable resin compositions prepared in Examples and Comparative Examples were subjected to the following tests (1) to (4). The results are shown in Table 1 below. Test methods used in Examples and Comparative Examples in Table 1 are those as follows. When at least all of the following tests (1) to (4) were passed, the photocurable resin compositions were determined to be suitable.

(1) Test for Confirming Curing Degree

As for the curing degree, the reduction rate of acryloyl groups or methacryloyl groups before and after irradiation of the photocurable resin composition with light was measured by FT-IR (Spectrum 100, manufactured by PerkinElmer Co., Ltd.). The reduction rate was determined by substituting an absorption peak (absorption peak of a $CH_2=CH_2-$ group) height (P1) at 1635 $cm^{-1}$ from the baseline in the FT-IR measurement chart of the photocurable resin composition layer before irradiation with light and an absorption peak height (P2) at 1635 $cm^{-1}$ from the baseline in the FT-IR measurement chart of the cured material of the photocurable resin composition after irradiation with light into the following Equation (1). At this time, the light irradiation was performed by irradiating the photocurable resin composition applied to a thickness of 50 μm with irradiation light having a wavelength of 365 nm in an accumulated light amount of 20 $kJ/m^2$. The results are shown in Table 1. Note that a curing degree of 75% or more is determined as pass, and the curing degree is more preferably 77% or more, and particularly preferably 80% or more.

$$\text{Curing degree (\%)} = ((P1-P2)/P1) \times 100 \quad (1)$$

(2) Measurement of Hardness

A sheet-like cured material was fabricated by curing each photocurable resin composition with the thickness set to 1 mm while irradiating it with ultraviolet rays in an accumulated light amount of 45 $kJ/m^2$. A pressing surface of a type A durometer (hardness tester) was pressed against a test piece (six sheet-like cured materials stacked with a thickness set to 6 mm) with a force of 10 N while being kept in parallel to the test piece, thereby bringing the pressing surface and the sample into close contact with each other. The maximum value was read during measurement, and the maximum value was used as "hardness". The results are shown in Table 1. The details are in accordance with JIS K 6253 (2012). When the hardness is 3 to 95, it is determined as pass. More preferably, the hardness is 5 to 90.

(3) Measurement of Tensile Strength

A sheet-like cured material was fabricated by curing each photocurable resin composition with the thickness set to 1 mm while irradiating it with ultraviolet rays in an accumulated light amount of 45 kJ/m². The cured material was punched out with a No. 3 dumbbell to form a test piece. Both ends of the test piece were fixed to the chucks such that the long axis of the test piece and the centers of the chucks were aligned in a line. The test piece was pulled at a tensile speed of 500 mm/min, and the maximum load was measured. The strength under the maximum load was defined as "tensile strength (MPa)". The results are shown in Table 1. The details are in accordance with JIS K 6251 (2010). Note that, from the viewpoint of high strength in the present invention, a tensile strength of 1.2 MPa or more is determined as pass, and the tensile strength is more preferably 1.7 MPa or more.

(4) Measurement of Elongation of Cured Material

A sheet-like cured material was fabricated by curing each photocurable resin composition with the thickness set to 1 mm while irradiating it with ultraviolet rays in an accumulated light amount of 45 kJ/m². The cured material was punched out with a No. 3 dumbbell to form a test piece, and gauge lines were marked on the test piece at an interval of 20 mm. The test piece was fixed to the chucks in the same manner as in measurement of the tensile strength, and pulled at a tensile speed of 500 mm/min until the test piece was broken. Since the test piece was elongated during the measurement to increase the interval between the gauge lines, the interval between the gauge lines was measured with a vernier caliper until the test piece was broken. A ratio of an elongated length to the initial interval between the gauge lines was defined as "elongation (%)". Evaluation was performed based on the following criteria, and the results are shown in Table 1. Note that an elongation of 310% or more is determined as pass from the viewpoint of high extensibility, and it is more preferably 350% or more.

TABLE 1

| | (1) Curing degree (%) | (2) Hardness | (3) Tensile strength (MPa) | (4) Elongation (%) |
|---|---|---|---|---|
| Example 1 | 80.2 | 66 | 8.5 | 468 |
| Example 2 | 79.1 | 46 | 7.7 | 550 |
| Example 3 | 86.8 | 29 | 4.6 | 560 |
| Example 4 | 92.1 | 14 | 1.3 | 425 |
| Example 5 | 88.3 | 36 | 4.7 | 515 |
| Example 6 | 87.9 | 28 | 4.0 | 540 |
| Example 7 | 80.4 | 64 | 12.5 | 530 |
| Comparative Example 1 | 80.8 | 92 | 7.6 | 302 |
| Comparative Example 2 | 91.8 | 13 | 1.0 | 297 |
| Comparative Example 3 | 68.2 | | Uncured | |
| Comparative Example 4 | 51 | | Uncured | |
| Comparative Example 5 | | Non-compatible | | |

Examples 1 to 7 in Table 1 demonstrate that the present invention can provide a photocurable resin composition having a high curing degree after irradiation with light while maintaining cured material characteristics such as high extensibility and high strength.

Comparative Example 1 in Table 1, which was a photocurable resin composition not containing (b2-1) of the ingredient (B) of the present invention, was poor in that it was not a cured material with high extensibility. Further, Comparative Example 2, which was a photocurable resin composition not containing (b1-1) of the ingredient (B) of the present invention, was poor in that it was not a cured material with high extensibility and high strength. Furthermore, Comparative Example 3, which was a photocurable resin composition using a methacrylate monomer having an alicyclic hydrocarbon group instead of the ingredient (b1) of the ingredient (B) of the present invention, was poor in curing degree. Comparative Example 4, which was a photocurable resin composition using a methacrylate monomer having an alicyclic hydrocarbon group instead of the ingredient (b1) of the ingredient (B) of the present invention and using a methacrylate monomer having a linear or branched alkyl group instead of the ingredient (b2), was poor in curing degree. In addition, Comparative Example 5, which was a photocurable resin composition using not the ingredient (b1) of the ingredient (B) of the present invention but an acrylate monomer having an aromatic ring, was not compatible with the ingredient (A) of the present invention and separated from the ingredient (A), whereby the test was not able to be performed.

Further, (5) Test for Adhesive Strength to PEN and (6) Viscosity Measurement were conducted. The results are shown in Table 2.

(5) Test for Adhesive Strength to PEN

Each of the photocurable resin compositions of Example 1 to 7 and Comparative Examples 1 to 5 was applied to a PEN test piece having a width of 25 mm, a length of 100 mm, and a thickness of 1.6 mm, and then the PEN test piece was bonded and fixed to another PEN test piece similar to the above PEN test piece so as to have a width of 25 mm and a length of 10 mm, and then irradiated it with ultraviolet rays in an accumulated light amount of 45 kJ/m², and the photocurable resin composition was cured to form a test piece. Both ends of the test piece were fixed, and the strength under the maximum load measured when pulled at a tensile speed of 10 mm/min was defined as "adhesive strength (MPa) to PEN". The results are shown in Table 2. In the present invention, from the viewpoint that the adhesive strength to PEN used for the frame is excellent, an adhesive strength of 0.8 MPa or more is determined as pass, and it is more preferably 1.0 MPa or more. Here, the results of Comparative Examples 3 and 4 in Table 2 are indicated as "uncured", and it means that the test was not able to be performed because Comparative Examples 3 and 4 were not cured. Since Comparative Example 5 was not compatible, the test was not able to be performed. Note that the PEN used herein was a member through which light is transmitted.

(6) Viscosity Measurement

The viscosity (Pa·s) of each of the photocurable resin compositions was measured by a rheometer; HAAKE MARS 3, manufactured by Thermo Fisher Scientific K.K. under the following measurement conditions. In the present invention, from the viewpoint of being excellent in screen printability and adhesibility to a polymer electrolyte membrane, a viscosity of 50 Pa·s or less is determined as pass. The viscosity is more preferably 20 Pa·s or less and particularly preferably 10 Pa·s or less. Note that, since Comparative Example 5 was not compatible, the test was not able to be performed.

Measurement Conditions

Shear rate 10 (1/s), and temperature 25° C.

TABLE 2

| | (5) Adhesive strength to PEN (MPa) | (6) Viscosity (Pa·s) |
|---|---|---|
| Example 1 | 2.1 | 7.4 |
| Example 2 | 1.4 | 6.3 |
| Example 3 | 1.6 | 5.4 |

TABLE 2-continued

|  | (5) Adhesive strength to PEN (MPa) | (6) Viscosity (Pa·s) |
|---|---|---|
| Example 4 | 0.8 | 3.4 |
| Example 5 | 1.3 | 5.7 |
| Example 6 | 1.1 | 4.8 |
| Example 7 | 1.8 | 10.2 |
| Comparative Example 1 | 3.1 | 9.5 |
| Comparative Example 2 | 0.7 | 3.4 |
| Comparative Example 3 | Uncured | 5.3 |
| Comparative Example 4 | Uncured | 5.5 |
| Comparative Example 5 | Non-compatible | |

Examples 1 to 7 in Table 2 demonstrate that the present invention has an excellent adhesive strength to PEN used for the frame and a low viscosity. Further, Comparative Example 1, which was a photocurable resin composition not containing (b2-1) of the ingredient (B) of the present invention, had no problem in adhesive strength to PEN. However, Comparative Example 2, which was a photocurable resin composition not containing (b1-1), was poor in adhesive strength to PEN. Furthermore, Comparative Example 3, which was a photocurable resin composition using a methacrylate monomer having an alicyclic hydrocarbon group instead of the ingredient (b1) of the ingredient (B) of the present invention, was uncured. Comparative Example 4, which was a photocurable resin composition using a methacrylate monomer having an alicyclic hydrocarbon group instead of the ingredient (b1) of the ingredient (B) of the present invention and using a methacrylate monomer having a linear or branched alkyl group instead of the ingredient (b2), was uncured. In addition, Comparative Example 5, which was a photocurable resin composition using not the ingredient (b1) of the ingredient (B) of the present invention but an acrylate monomer having an aromatic ring, was not incompatible with the ingredient (A) of the present invention and separated from the ingredient (A), whereby the test was not able to be performed.

Further, tests of (7) Moisture Permeability (Water Vapor Barrier Property) and (8) Hydrogen Gas Barrier Property were conducted.

(7) Moisture Permeability (Water Vapor Barrier Property)

The photocurable resin composition of Example 2 was poured into a frame of 200 mm×200 mm×1.0 mm. Thereafter, the photocurable resin composition was irradiated with ultraviolet rays for 20 seconds using an ultraviolet irradiator in an accumulated light amount of 45 kJ/m$^2$, and a sheet-like cured material having a thickness of 1.0 mm was formed. 5 g of (anhydrous) calcium chloride was placed in an aluminum cup having an opening with a diameter of 30 mm, and the cured material was set in the cup so that the cured material is covered with calcium chloride. After the "initial total weight" (g) was measured, the cup was left for 24 hours in a thermo-hygrostat kept at an atmosphere temperature of 40° C. and a relative humidity of 95% RH. Thereafter, the "total weight after leaving" (g) was measured, the moisture permeability (g/m$^2$·24 h) was calculated, and evaluated based on the following evaluation criteria. The results are shown in Table 3. The detailed test method was in accordance with JIS Z0208. For use as a curable sealing agent for a fuel cell, the moisture permeability is preferably less than 10 g/m$^2$·24 h.

[Evaluation Criteria]

Pass: the moisture permeability is less than 10 g/m$^2$·24 h; and

Fail: the moisture permeability is 10 g/m$^2$·24 h or more.

(8) Hydrogen Gas Barrier Property Test

The photocurable resin composition of Example 2 was used and irradiated with ultraviolet rays for 20 seconds using an ultraviolet irradiator in an accumulated light amount of 45 kJ/m$^2$, and a sheet-like cured material having a thickness of 1.0 mm was formed. Then, the sheet-like cured material thus obtained was used, and the hydrogen gas barrier property was measured in accordance with JIS K 7126-1: 2006 (Plastics-Film and sheeting-Determination of gas-transmission rate-Part 1: Differential-pressure method). The type of the test was a pressure sensor method, the conditions were at 23° C., and a test gas (hydrogen gas) on the high pressure side was measured at 100 kPa, and then the hydrogen gas barrier property was evaluated based on the following evaluation criteria. The results are shown in Table 3. For use as a photocurable sealing agent for a fuel cell, the hydrogen gas barrier property is preferably less than 1×10$^{-15}$ mol·m/m$^2$·s·Pa.

[Evaluation Criteria]

Pass: less than 1×10$^{-15}$ mol·m/m$^2$·s·Pa; and

Fail: 1×10$^{-15}$ mol·m/m$^2$·s·Pa or more.

TABLE 3

|  | (7) Water vapor barrier property test | (8) Hydrogen gas barrier property test |
|---|---|---|
| Example 2 | Pass | Pass |

Example 2 in Table 3 demonstrates that the photocurable resin composition of the present invention has low in moisture permeability and is excellent in hydrogen gas barrier property, and has good sealability.

The present invention has been made in view of the above circumstances, and can be used in various sealing applications because it is a photocurable resin composition having a high curing degree after irradiation with light while maintaining cured material characteristics such as high extensibility and high strength. In particular, the present invention is effective as a curable sealing agent for a fuel cell, so it is industrially useful.

REFERENCE SIGNS LIST

1 Cell of polymer electrolyte fuel cell
2 Separator
3a Air electrode (cathode)
3b Fuel electrode (anode)
4 Polymer electrolyte membrane
Electrolyte membrane electrode assembly (MEA)
6 Frame
7 Sealing portion
8a Oxidation gas flow path
8b Fuel gas flow path
9 Cooling water flow path
10 Cell stack
11 Polymer electrolyte fuel cell

What is claimed is:

1. A photocurable resin composition comprising the following ingredients (A) to (C):

ingredient (A): a polyisobutylene resin containing one or more (meth)acryloyl groups and a —[CH$_2$C(CH$_3$)$_2$]— unit;

ingredient (B): ingredient (b1): an acrylate monomer having an alicyclic hydrocarbon group having 5 to 25 carbon atoms, and ingredient (b2): an acrylate monomer having a linear or branched alkyl group having 11 to 30 carbon atoms; and ingredient (C): a photo-radical polymerization initiator, wherein the photocurable resin composition comprises 66 to 95 parts by mass of the ingredient (b1) and 3 to 22 parts by mass of the ingredient (b2), relative to 100 parts by mass of the ingredient (A), and the photocurable resin composition does not contain a methacrylate monomer.

2. The photocurable resin composition according to claim 1, wherein the ingredient (A) is a polyisobutylene resin represented by the following Formula (1):

[Chem. 1]

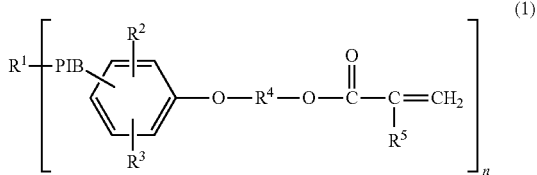

(1)

wherein $R^1$ represents a monovalent or polyvalent aromatic hydrocarbon group or a monovalent or polyvalent aliphatic hydrocarbon group, PIB represents a polyisobutylene skeleton containing the —[$CH_2C(CH_3)_2$]— unit, $R^4$ represents a divalent hydrocarbon group having 2 to 6 carbon atoms, $R^2$ and $R^3$ each independently represent a hydrogen atom or a monovalent hydrocarbon group having 1 to 20 carbon atoms, $R^5$ represents a hydrogen atom or a methyl group, and n is an integer from 1 to 6.

3. The photocurable resin composition according to claim 1, wherein the ingredient (b1) is one or more compounds selected from the group consisting of 4-tert-butylcyclohexyl acrylate, dicyclopentanyl acrylate, and isobornyl acrylate, and the ingredient (b2) is one or more compounds selected from the group consisting of isostearyl acrylate and n-lauryl acrylate.

4. The photocurable resin composition according to claim 1, wherein a curing degree of the photocurable resin composition is 75% or more.

5. The photocurable resin composition according to claim 1, wherein a tensile strength of a cured material of the photocurable resin composition is 1.2 MPa or more.

6. The photocurable resin composition according to claim 1, wherein an elongation of a cured material of the photocurable resin composition is 310% or more.

7. A curable sealing agent for a fuel cell, comprising the photocurable resin composition set forth in claim 1.

8. The curable sealing agent for a fuel cell according to claim 7, wherein the curable sealing agent for a fuel cell is a curable sealing agent for a fuel cell for a periphery of one or more members selected from the group consisting of a separator, a frame, a polymer electrolyte membrane, a fuel electrode, an air electrode, and an electrolyte membrane electrode assembly, which are members in the fuel cell.

9. The curable sealing agent for a fuel cell according to claim 8, wherein the curable sealing agent for a fuel cell is a sealing agent between adjacent separators in a fuel cell or a sealing agent between a frame and a polymer electrolyte membrane or an electrolyte membrane electrode assembly in the fuel cell.

10. The curable sealing agent for a fuel cell according to claim 7, wherein the curable sealing agent for a fuel cell is a curable sealing agent for a polymer electrolyte fuel cell.

11. A cured material which is formed by irradiating the curable sealing agent for a fuel cell set forth in claim 7 with light.

12. A cured material which is formed by irradiating the photocurable resin composition set forth in claim 1 with light.

13. A fuel cell, comprising a sealing portion between adjacent separators in the fuel cell or a sealing portion between a frame and a polymer electrolyte membrane or an electrolyte membrane electrode assembly in the fuel cell which includes the cured material set forth in claim 12.

14. The fuel cell according to claim 13, wherein the fuel cell is a polymer electrolyte fuel cell.

15. A method for sealing at least part of two flanges, at least one of the flanges being an active-energy-ray-transmissive flange,
the method comprising:
applying the photocurable resin composition set forth in claim 1 to a surface of one of the flanges;
sticking the one flange with the photocurable resin composition applied thereto onto the other flange with the photocurable resin composition interposed therebetween; and
curing the photocurable resin composition by irradiating the photocurable resin composition with active energy rays through the active-energy-ray-transmissive flange and sealing the at least part of the two flanges.

16. A method for sealing at least part of two flanges comprising:
applying the photocurable resin composition set forth in claim 1 to a surface of one of the flanges;
curing the photocurable resin composition by irradiating the photocurable resin composition with active energy rays and forming a gasket formed of a cured material of the photocurable resin composition on the one flange; and
placing the other flange on the gasket and sealing the at least part of the two flanges by pressure bonding the one flange and the other flange together with the gasket interposed therebetween.

17. A method for sealing at least part of two flanges comprising:
placing a gasket formation mold on one of the flanges;
injecting the photocurable resin composition set forth in claim 1 into at least part of a cavity formed between the gasket formation mold and the one flange;
curing the photocurable resin composition by irradiating the photocurable resin composition with active energy rays and forming a gasket formed of a cured material of the photocurable resin composition on the one flange;
detaching the mold from the one flange; and
placing the other flange on the gasket and sealing the at least part of the two flanges by pressure bonding the one flange and the other flange together with the gasket interposed therebetween.

18. The photocurable resin composition according to claim 1, wherein the photocurable resin composition does not contain an acrylate monomer other than the ingredient (b1) and the ingredient (b2).

* * * * *